US012795045B2

(12) United States Patent
Balaji et al.

(10) Patent No.: US 12,795,045 B2
(45) **Date of Patent: *Nov. 10, 2026**

(54) DYNAMIC LOW LIGHTING ADJUSTMENT IN VIDEO COMMUNICATIONS

(71) Applicant: Zoom Communications, Inc., San Jose, CA (US)

(72) Inventors: Abhishek Balaji, San Jose, CA (US); Bo Ling, Saratoga, CA (US); Min Miao, Zhejiang (CN); Nitasha Walia, Sunnyvale, CA (US); Xingguo Zhu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/777,860

(22) Filed: Jul. 19, 2024

(65) Prior Publication Data

US 2024/0372964 A1 Nov. 7, 2024

Related U.S. Application Data

(63) Continuation of application No. 17/390,917, filed on Jul. 31, 2021, now Pat. No. 12,081,904.

(30) Foreign Application Priority Data

Jul. 2, 2021 (CN) ........................ 202110747466.8

(51) Int. Cl.
*H04N 7/14* (2006.01)
*H04N 23/56* (2023.01)
*H04N 23/611* (2023.01)
*H04N 23/74* (2023.01)

(52) U.S. Cl.
CPC ............ *H04N 7/147* (2013.01); *H04N 23/56* (2023.01); *H04N 23/611* (2023.01); *H04N 23/74* (2023.01)

(58) Field of Classification Search
CPC ........ H04N 7/147; H04N 23/74; H04N 23/56; H04N 23/611
See application file for complete search history.

(56) References Cited

U.S. PATENT DOCUMENTS 6,571,003 B1 * 5/2003 Hillebrand .......... A61B 5/0064 382/118
2015/0160839 A1 6/2015 Krishnaswamy et al.
2016/0086316 A1 * 3/2016 Lee .......................... G06T 5/20 382/167
2019/0057491 A1 * 2/2019 Yang ........................ G06T 5/20
2020/0151964 A1 * 5/2020 Chen .................... G06T 15/005
2023/0030170 A1 2/2023 Balaji et al.

* cited by examiner

*Primary Examiner* — Amal S Zenati
(74) *Attorney, Agent, or Firm* — Young Basile Hanlon & MacFarlane, P.C.

(57) ABSTRACT

Low lighting adjustments can be provided within a video communication session. A system generates a lighting adjustment request including a lighting adjustment depth, then segments a region of a video frame into texture sub-regions. The system smoots areas that are adjacent to the texture sub-regions. The system detects an amount of lighting using an artificial intelligence model and modifies the video frame to adjust the amount of lighting. The amount of adjustment of lighting corresponds to the lighting adjustment depth.

20 Claims, 12 Drawing Sheets

DYNAMIC LOW LIGHTING ADJUSTMENT IN VIDEO COMMUNICATIONS

CROSS-REFERENCE TO RELATED APPLICATION(S)

This application is a continuation of U.S. patent application Ser. No. 17/390,917, filed Jul. 31, 2021, which claims priority to and the benefit of Chinese Patent Application Serial 202110747466.8, filed Jul. 2, 2021, the entire disclosures of which are hereby incorporated by reference.

FIELD OF INVENTION

The present invention relates generally to digital media, and more particularly, to systems and methods for providing video appearance adjustments within a video communication session.

BACKGROUND

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

One of the side effects of such virtual, remote meetings via video communication sessions is that not all participants feel comfortable broadcasting video of themselves in group sessions, or even one-on-one meetings. Some users may not feel as if they have had time to make themselves presentable enough for a meeting, or may be self-conscious for one reason or another. Others may simply wish to make themselves appear in some enhanced way. In some cases, the video setup of the user may present the user in an unflattering way, and the user wishes to counteract this.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein.

DETAILED DESCRIPTION

Figure 1A:
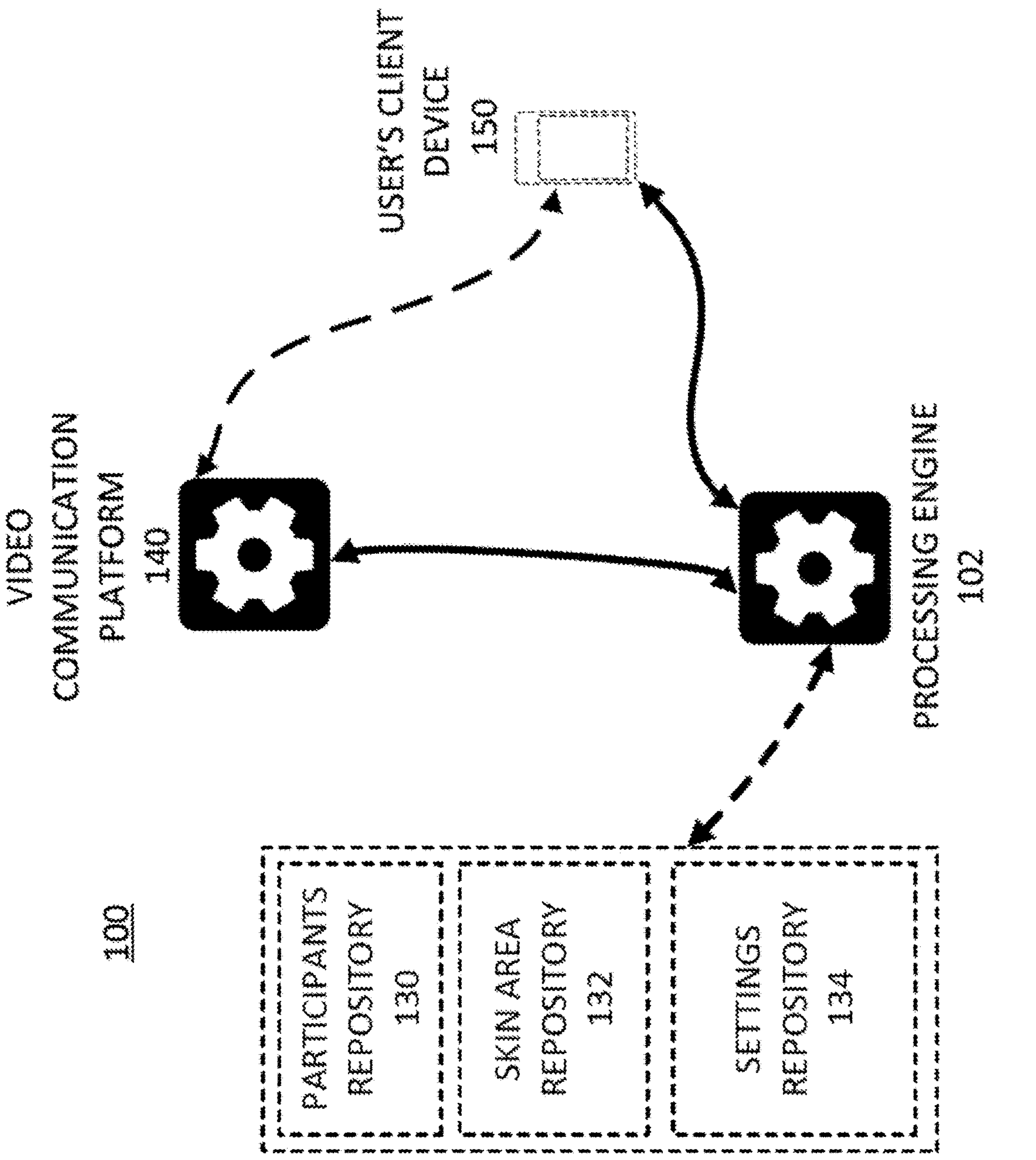
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During remote video sessions, lighting may be an issue for some users. When users are outside, for example, the video could appear as if heavily contrasted due to the bright sunlight. The opposite problem is when a user is in an environment which is not properly lit, such that the user and background both appear dark and unlit. Simply increasing or decreasing the brightness of the video to adjust for such conditions may lead to the user's skin tone appearing unnatural and no longer accurate. Thus, the user wishes to adjust the lighting of the video as if a light is being shined on their natural skin tone color, rather than their skin tone color being modified.

In some cases, the user may want such configuration tools to adjust the appearance of the video being presented.

However, they may have a preference to only have a slight amount of their appearance be touched up, or to only have a slight amount of the lighting adjusted. Not simply having a binary state of adjustment or non-adjustment, but rather having a granular level of control over the appearance, is desirable.

Thus, there is a need in the field of digital media to create a new and useful system and method for providing video appearance adjustments within a video communication session. The source of the problem is a lack of ability for participants to granularly adjust the appearance of themselves and/or the lighting within a video in real time while retaining their natural skin tones.

The invention overcomes the existing problems by providing users with the ability to adjust their appearance within a video. The user can select one or more video settings options to touch up the user's appearance and/or adjust the video for low light conditions. The settings include a granular control element, such as a slider, which allows the user to select a precise amount of appearance adjustment depth and/or lighting adjustment depth. The system then performs the modification of the user's appearance or adjustment for low lighting in real time or substantially real time upon the user selecting the adjustment option. As the user adjusts the depth (e.g., by dragging the depth slider left or right), a preview window reflects the change to the video that results in real time or substantially real time. The adjustments are also performed in such a way that the user's natural skin tones are preserved.

One embodiment relates to a method for providing video appearance adjustments within a video communication session. First, the system receives video content within a video communication session of a video communication platform, with the video content having multiple video frames. The system then receives an appearance adjustment request comprising an adjustment depth, and detects imagery of a user within the video content. The system then detects a face region within the video content. The system segments the face region into a number of skin areas. For each of the plurality of skin areas, the system classifies the skin area as a smooth texture region or rough texture region. If the skin area is classified as a smooth texture region, the system modifies the imagery of the user in real time or substantially real time by applying a smoothing process to the skin area, where the amount of smoothing applied corresponds to the adjustment depth.

In some embodiments, methods and systems provide for low lighting adjustments within a video communication session. First, the system receives video content within a video communication session of a video communication platform, the video content having multiple video frames. The system then receives or generates a lighting adjustment request including a lighting adjustment depth, then detects an amount of lighting in the video content. The system then modifies the video content to adjust the amount of lighting, wherein the amount of adjustment of lighting corresponds to the adjustment depth, and wherein adjusting the amount of lighting is performed in real time or substantially real time upon receiving the lighting adjustment request.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a user's client device is connected to a processing engine 102 and, optionally, a video communication platform 140. The processing engine 102 is connected to the video communication platform 140, and optionally connected to one or more repositories and/or databases, including a participants repository 130, skin area repository 132, and/or a settings repository 134. One or more of the databases may be combined or split into multiple databases. The user's client device 150 in this environment may be a computer, and the video communication platform server 140 and processing engine 102 may be applications or software hosted on a computer or multiple computers which are communicatively coupled via remote server or locally.

The exemplary environment 100 is illustrated with only one user's client device, one processing engine, and one video communication platform, though in practice there may be more or fewer client devices, processing engines, and/or video communication platforms. In some embodiments, the client device, processing engine, and/or video communication platform may be part of the same computer or device.

Figure 2:
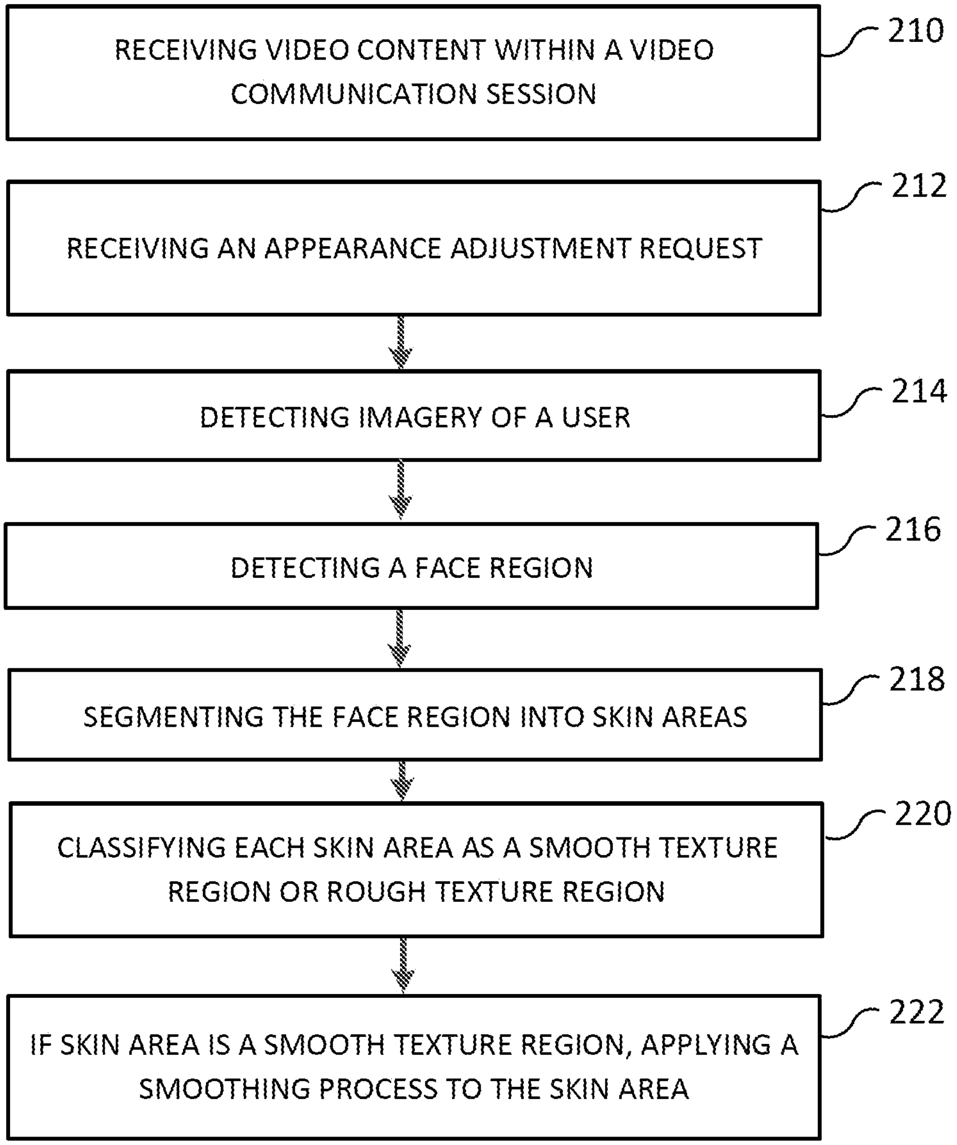
FIG. 2 is a flow chart illustrating an exemplary method for providing video appearance adjustment that may be performed in some embodiments.
Figure 3:
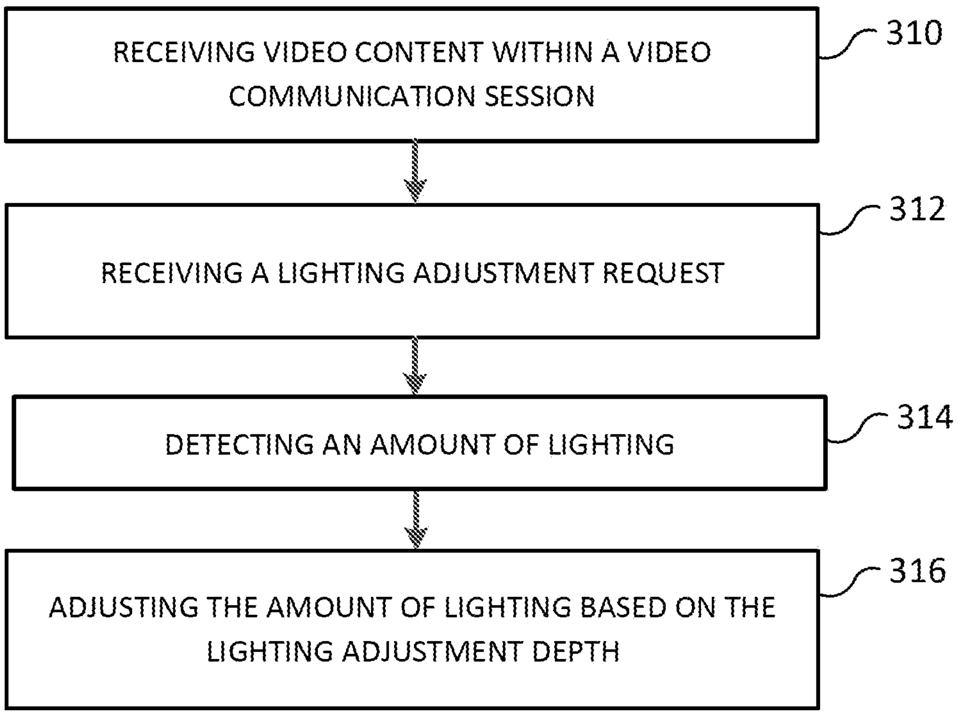
FIG. 3 is a flow chart illustrating an exemplary method for providing video lighting adjustment that may be performed in some embodiments.

In an embodiment, the processing engine 102 may perform the exemplary method of FIG. 2, the exemplary method of FIG. 3, or other method herein and, as a result, provide video appearance adjustments within a video communication session. In some embodiments, this may be accomplished via communication with the user's client device, processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The user's client device 150 is a device with a display configured to present information to a user of the device. In some embodiments, the client device presents information in the form of a user interface (UI) with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, and client device 150 may be the same device. In some embodiments, the user's client device 150 is associated with a user account within a video communication platform.

In some embodiments, optional repositories can include one or more of a participants repository 130, skin area repository 132, and/or settings repository 134. The optional repositories function to store and/or maintain, respectively, participant information associated with a video communication session on the video communication platform 140, segments of skin areas present within video feeds of users within a video communication session, and settings of the video communication session and/or preferences of users within a video communication platform. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate video communication between two or more parties, such as within a conversation, video conference or meeting, message board or forum, virtual meeting, or other form of digital communication. The video communication session may be one-to-many (e.g., a speaker presenting to multiple attendees), one-to-one (e.g., two friends speaking with one another), or many-to-many (e.g., multiple participants speaking with each other in a group video setting).

Figure 1B:
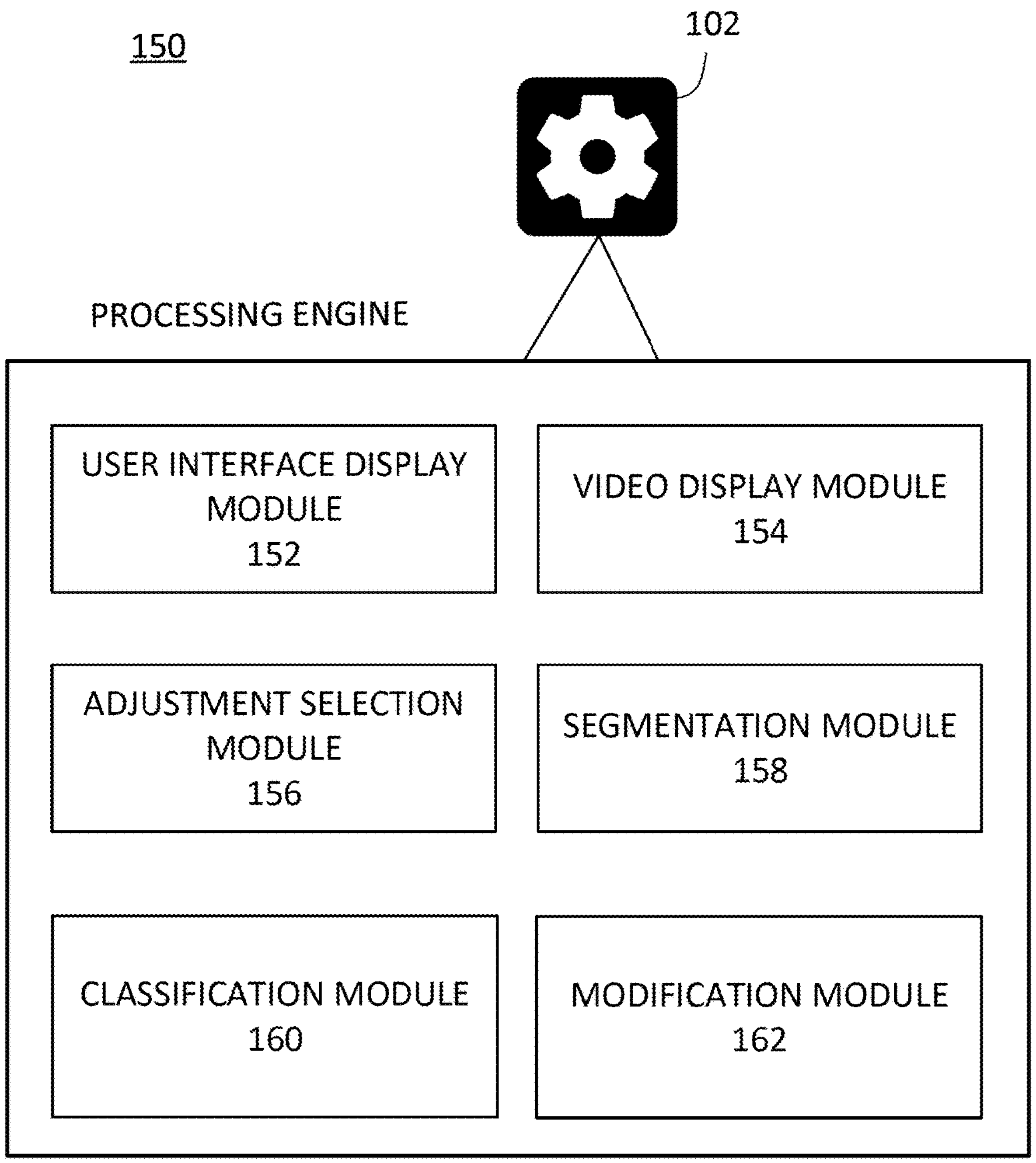
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

User interface display module 152 functions to display a UI for each of the participants within the video communication session, including at least a settings UI element with configuration settings for video broadcasting within the video communication platform, participant windows corresponding to participants, and videos displayed within participant windows.

Video display module 154 functions to display the videos for at least a subset of the participants, which may appear as live video feeds for each participant with video enabled.

Adjustment selection module 156 functions to receive, from a client device, a selection of one or more video appearance adjustment elements within a settings UI.

Segmentation module 158 functions to segment a face region of a user that appears within a video feed being broadcasted within a video communication session that corresponds to the user. The face region is segmented into multiple skin areas.

Classification module 160 functions to classify the segmented skin areas of the face region as smooth texture regions or rough texture regions based on a received adjustment depth.

Modification module 162 functions to modify the imagery of the user by applying a smoothing process to the skin area based on the received adjustment depth. The modification is performed in real time or substantially real time upon receiving an appearance adjustment request.

The above modules and their functions will be described in further detail in relation to an exemplary method below.

FIG. 2 is a flow chart illustrating an exemplary method that may be performed in some embodiments.

At step 210, the system receives video content within a video communication session of a video communication platform. In some embodiments, the video content has multiple video frames. In some embodiments, the video content is generated via an external device, such as, e.g., a video camera or a smartphone with a built-in video camera, and then the video content is transmitted to the system. In some embodiments, the video content is generated within the system, such as on the user's client device. For example, a participant may be using her smartphone to record video of herself giving a lecture. The video can be generated on the smartphone and then transmitted to the processing system, a local or remote repository, or some other location. In some embodiments, the video content is pre-recorded and is retrieved from a local or remote repository. In various embodiments, the video content can be streaming or broadcasted content, pre-recorded video content, or any other suitable form of video content. The video content has multiple video frames, each of which may be individually or collectively processed by the processing engine of the system.

In some embodiments, the video content is received from one or more video cameras connected to a client device associated with the first participant and/or one or more client devices associated with the additional participants. Thus, for example, rather than using a camera built into the client device, an external camera can be used which transmits video to the client device.

In some embodiments, the first participant and any additional participants are users of a video communication platform, and are connected remotely within a virtual video communication room generated by the video communication platform. This virtual video communication room may be, e.g., a virtual classroom or lecture hall, a group room, a breakout room for subgroups of a larger group, or any other suitable video communication room which can be presented within a video communication platform.

In some embodiments, the video content is received and displayed on a user's client device. In some embodiments, the system displays a user interface for each of a plurality of participants within the video communication session. The UI includes at least a number of participant windows corresponding to participants, and video for each of at least a subset of the participants to be displayed within the corresponding participant window for the participant. In some cases, a participant may wish to not enable a video feed to be displayed corresponding to himself or herself, or may not have any video broadcasting capabilities on the client device being used. Thus, in some instances, for example, there may be a mix of participant windows with video and participant windows without video.

Figure 4A:
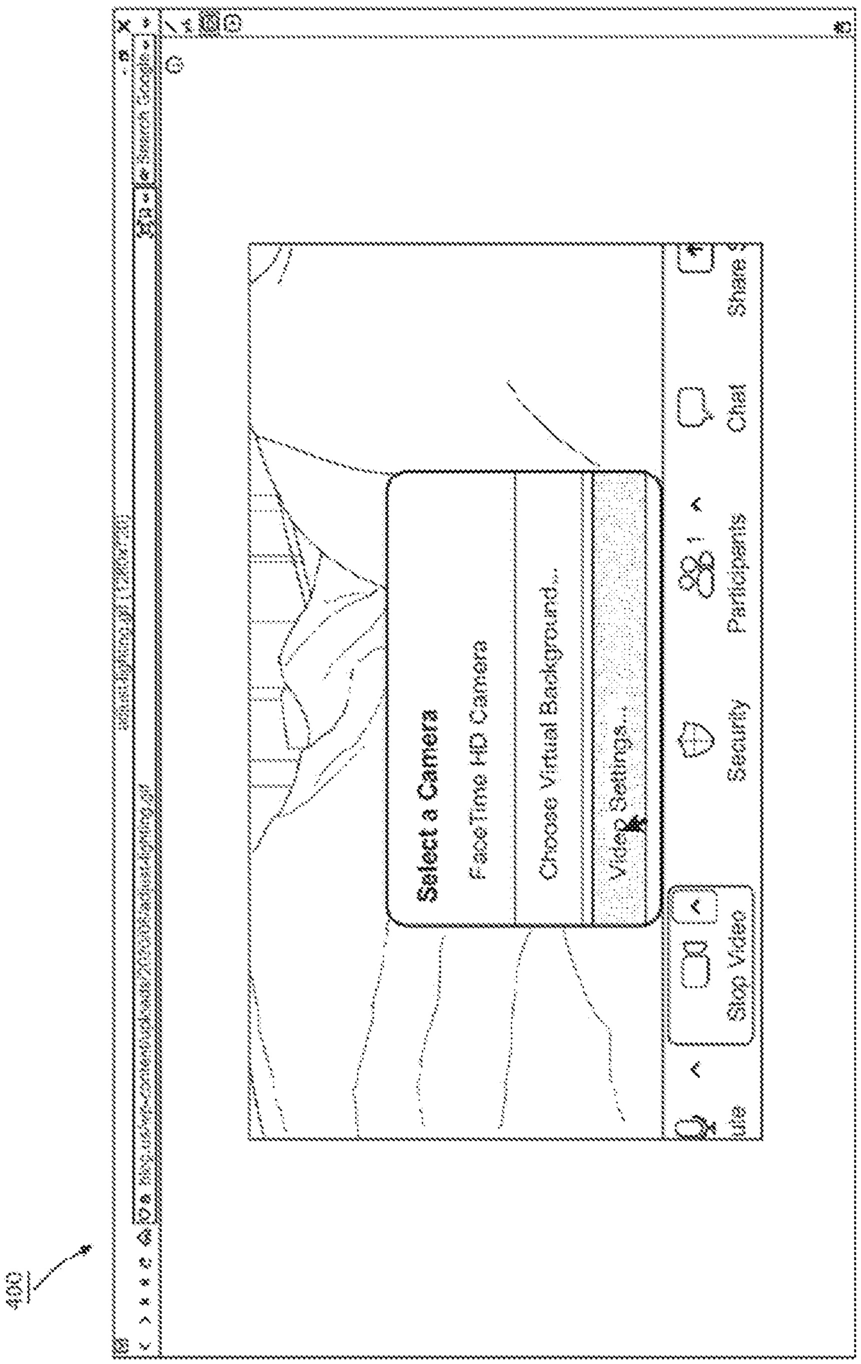
FIG. 4A is a diagram illustrating one example embodiment of a video settings UI element within a video communication session.

The UI to be displayed relates to the video communication platform 140, and may represent a "video window", such as a window within a GUI that displays a video between a first participant, with a user account within the video platform, and one or more other user accounts within the video platform. The first participant is connected to the video communication session via a client device. In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, displaying a chat window for messages between participants of the session, and/or ending the video session. A video settings UI element may also be selectable, either directly or within a menu or submenu. One example of a communication interface within a video communication platform is illustrated in FIG. 4A, which will be described in further detail below.

Figure 4B:
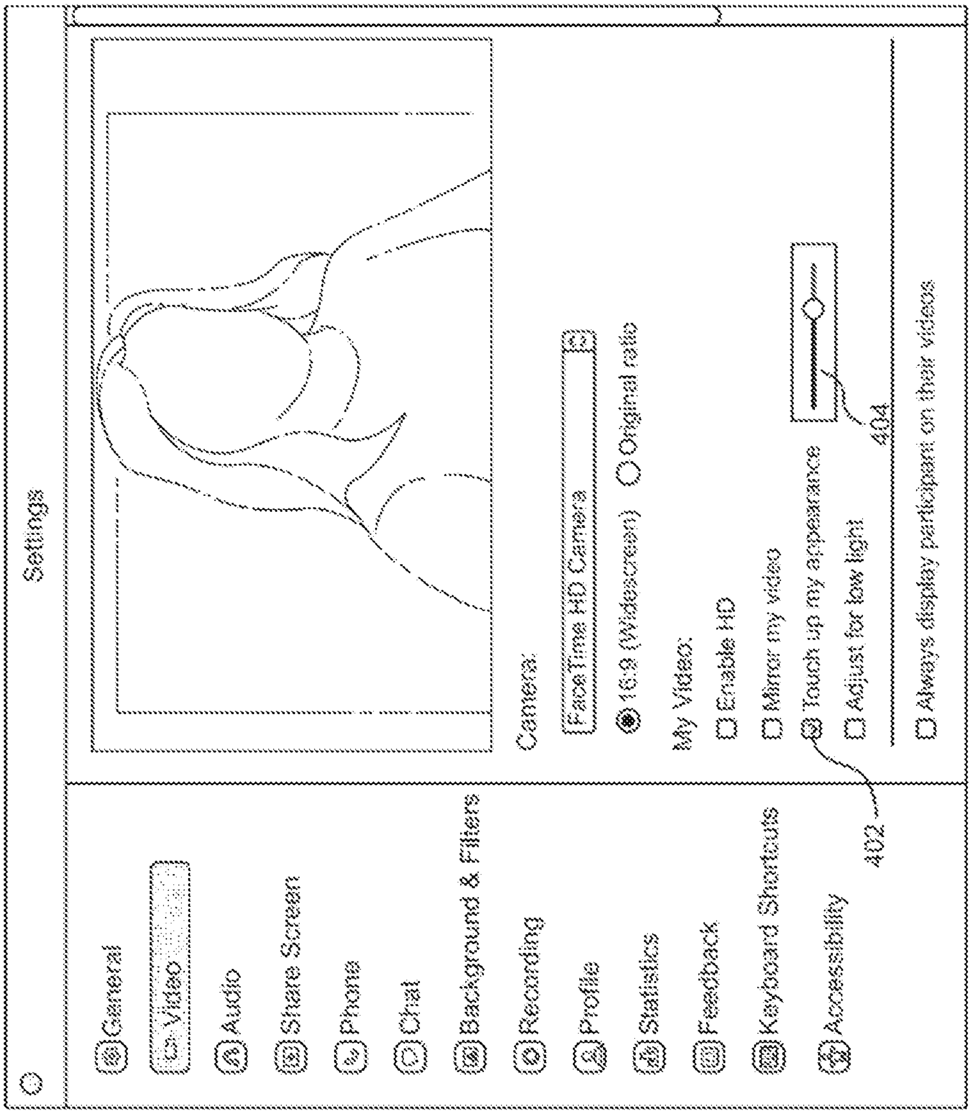
FIG. 4B is a diagram illustrating one example embodiment of appearance adjustment UI elements within a video communication session.]

In some embodiments, one included UI element is a selectable video settings UI window. An example of this UI window is illustrated in FIG. 4B, which will be described in further detail below. Examples of selectable settings within a video settings UI window may include, e.g., options to enable high-definition (HD) video, mirror the user's video, touch up the user's appearance within the video, adjust the video for low light, and more. In some embodiments, settings such as touching up the user's appearance and adjusting the video for low light may include UI elements for adjusting the depth of the effect. In some examples, such UI elements may be sliders.

Another portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or a virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). The participant windows are also configured to display imagery of the participant in question, if the participant opts to appear within the video being broadcasted, as will be discussed in further detail below. Some participant windows may not contain any video, for example, if a participant has disabled video or does not have a connected video camera device (e.g. a built-in camera within a computer or smartphone, or an external camera device connected to a computer).

The videos displayed for at least a subset of the participants appear within each participant's corresponding participant window. Video may be, e.g., a live feed which is streamed from the participant's client device to the video communication session. In some embodiments, the system receives video content depicting imagery of the participant, with the video content having multiple video frames. The system provides functionality for a participant to capture and display video imagery to other participants. For example, the system may receive a video stream from a built-in camera of a laptop computer, with the video stream depicting imagery of the participant.

At step 212, the system receives an appearance adjustment request, including an adjustment depth. In some embodiments, the request is received from a client device associated with a user. The client device in question may be, e.g., the user's client device 150, where the user is a participant of the video session. In some embodiments, the user may have navigated within a user interface on their client device to the video settings UI window, and then checked a "touch up my appearance" checkbox or manipulated another such UI element. In some embodiments, the UI element may be selected by a participant by, e.g., clicking or holding down a mouse button or other component of an input device, tapping or holding down on the UI element with a finger, stylus, or pen, hovering over the UI element with a mouse or other input device, or any other suitable form of selecting a UI element. In some embodiments, upon selecting the UI element, a slider element, sub window, or other secondary UI element appears which provides the participant with the ability to granularly adjust the depth of the video appearance adjustment which is to be performed on the video of the participant. Upon selecting the desired adjustment depth, or simply allowing for the default adjustment depth without selecting one (the default depth may be, e.g., 100% or 50% depth), the selection of UI element(s) is sent to the system (e.g., the processing engine 102) to be processed.

In some embodiments, rather than receiving the appearance adjustment request from a client device, the system detects that an appearance adjustment should be requested based on one or more adjustment detection factors, then automatically generates an appearance adjustment request including an adjustment depth. In these embodiments, a user does not, e.g., select a UI element within a Video Settings UI window in order to enable an appearance adjustment. Instead, the user may enable a setting to turn on automatic appearance adjustment. The system then detects when an appearance adjustment may be needed based on one or more factors. In some embodiments, such adjustment detection factors may include, e.g., detected facial features visible in the video content such as wrinkles, spots, blemishes, or skin non-uniformities. In some embodiments, a user may specify parameters for when the system should detect that an appearance adjustment is needed. For example, a user may specify in a video setting that the system should automatically adjust appearance when skin blemishes show up on the screen. In some embodiments, the user may be able to select a range of skin tones that applies to them, and then the appearance adjustment can detect when there are discolorations, blemishes, spots, or skin non-uniformities based on those preselected skin tones. The appearance adjustment techniques can also preserve the user's skin tone based on the selected range of skin tones.

At step 214, the system detects imagery of a user within the video content. In some embodiments, the imagery of the user is detected via one or more video processing and/or analysis techniques. In some embodiments, the detection of the user's imagery may be performed by one or more Artificial Intelligence (AI) engines. Such AI engine(s) may be configured to perform aspects or techniques associated with, e.g., machine learning, neural networks, deep learning, computer vision, or any other suitable AI aspects or techniques. In some embodiments, such AI engine(s) may be trained on a multitude of differing images of user imagery appearing within video content, as well as images where user imagery does not appear within video content. In some embodiments, the AI engine(s) are trained to classify, within a certain range of confidence, whether a user appears or does not appear within a given piece of video content.

In some embodiments, the system crops the video content to include only a head region of the user. In some embodiments, the system generates new video content and/or multiple new frames from the video content, with the video content or frames cropped to isolate the region of the user's imagery to just the user's head. As in detecting the imagery of the user above, one or more AI engine(s) may be utilized to perform this cropping of the video content or frames to just the user's head.

In some embodiments, the system first determines a boundary about the user in the video frames in order to separate the user image from the background of the video, where the boundary has an interior portion and an exterior portion. In some embodiments, determining the boundary may partially or fully involve "image masking" techniques and/or backdrop removal techniques, whereby an image is separated from its background. Each of the video frames is a still image depicting the user. The outline of the user is detected by the system and used as the boundary about the user. The boundary has an interior portion, consisting of everything inside of the boundary or outline of the user; and an exterior portion, consisting of everything outside of the boundary or outline of the user. In some embodiments, the interior portion and exterior portion of the boundary each constitute layers which are separated into different images for each video frame. In various embodiments, image masking techniques used may include, e.g., layer masking, clipping mask, alpha channel masking, or any other suitable image masking techniques. In some embodiments, the boundary is updated each time the user moves, i.e., as additional video frames are received, such that the user moving around in the frame of the video leads to the boundary being updated. In some embodiments, once the boundary has been determined, the interior portion of the boundary is cropped to include just the head of the user.

At step 216, the system detects a face region within the video content. In some embodiments, as in previous steps, the system may detect the face region using one or more aspects or techniques of AI engine(s). For example, in some embodiments a deep learning model may be used for face detection. Such a deep learning model may be trained based on, e.g., a multitude of images of users' faces within cropped and/or uncropped images from video content. In some embodiments, one or more facial recognition algorithms are used. In some embodiments, feature-based methods may be employed. In some embodiments, statistical tools for geometry-based or template-based face recognition may be used, such as, e.g., Support Vector Machines (SVM), Principal Component Analysis (PCA), Linear Discriminant Analysis (LDA), Kernel methods or Trace Transforms. Such methods may analyze local facial features and their geometric relationships. In some embodiments, techniques or aspects may be piecemeal, appearance-based, model-based, template matching-based, or any other suitable techniques or aspects for detecting a face region.

At step 218, the system segments the face region into multiple skin areas. In some embodiments, as in previous steps, the system may segment the face region into multiple skin areas using one or more aspects or techniques of AI engine(s). In some embodiments, one or more algorithms are used to implement human face and facial feature detection. In some embodiments, various techniques or aspects may be employed, including, e.g., template matching, Eigen faces, neural network models, deformable templates, combined facial features methods, or any other suitable techniques or aspects. In some embodiments, the face region is segmented into discrete regions representing, e.g., mouth, eyes, hair, nose, chin, forehead, and/or other regions.

In some embodiments, the system detects skin color. In some embodiments, the system then segments the face region into multiple skin areas based on the detected skin color. In some embodiments, skin color may be a range of skin colors or skin tones which are determined for a user. Skin color may be detected based on various color spaces, such as, e.g., RGB, XYZ, CIE-Lab, HSV, or YcbCr. In some embodiments, hue and saturation domains are utilized in order to classify skin color, and one or more thresholds are set for these domains. For example, the hue and saturation values of each pixel in the image may be tested, and if they are within the interval formed by the thresholds, then the pixel is identified as a skin pixel. If the values are outside of the interval, then the pixel is not identified as a skin pixel.

At step 220, for each of the skin areas, the system classifies the skin area as either a smooth texture region or a rough texture region. In some embodiments, this classification is based on the adjustment depth which was provided along with the appearance adjustment request. The adjustment depth determines the threshold for whether a given skin area is to be classified as a smooth texture region as compared to a rough texture region. For example, if the adjustment depth received is 20%—i.e., the appearance adjustment should only be applied at 20% intensity to the user's image—then the system set a threshold for a skin area to be rough to be relatively high. The system then accordingly determines that most skin regions are to be classified as smooth (and thus do not need to be smoothed further). In contrast, if the appearance adjustment should be applied at 90% or 100% intensity, then the threshold for a skin area to be rough will be relatively low, such that most skin regions are to be classified as rough and in need of smoothing to be applied. In some embodiments, bilateral filtering may be employed to classify the skin areas. In some embodiments, segmenting the face region into multiple skin areas is based on a determined set of skin tones. For example, upon determining a set of skin tones for a user, the system can then separate out skin areas as differing from non-skin areas for the imagery of the user. In one example, the system first searches for a face region based on the skin color information, then identifies skin areas based on the skin color information.

At step 222, if the given skin area is classified as a smooth texture region, then the system modifies the imagery of the user in real time or substantially real time by applying a smoothing process to the skin area based on the adjustment depth. The smoothing process has the effect of appearing to smooth over certain irregularities visible on a face, such as, e.g., wrinkles, blemishes, spots, and skin non-uniformities. The smoothing process also restores or preserves the texture of rough edges within or adjacent to the skin area.

In some embodiments, bilateral filtering may be employed to smooth the face of the participant and preserve edges of the skin areas. Within traditional bilateral filtering, each pixel is replaced by a weighted average of its neighboring pixels. Each neighboring pixel is weighted by a spatial component that penalizes distant pixels and a range component that penalizes pixels with a different intensity. The combination of both components ensures that only nearby similar pixels contribute to the final result. In some embodiments, variants of bilateral filtering or similar techniques may be efficient enough with available computing resources to enable the smoothing process to occur in real time or substantially real time upon the system receiving an appearance adjustment request.

In some embodiments, the modification of the imagery is performed such that as soon as a user selects the UI element for touching up the user's appearance, a preview video is displayed in real time or substantially real time showing the user's video if the appearance adjustment is applied. The user may then, e.g., select different adjustment depths, or drag a slider UI element for the adjustment depth left or right, with the preview video registering the modifications and updated adjustments in real time or substantially real time. If a user selects a confirmation UI element, then the user's video appearance is adjusted accordingly for the video communication session, until the session ends or the user disables the appearance adjustment setting.

In some embodiments, one or more corrective processes are applied to restore the skin tones in the imagery to a set of detected skin tones in the imagery. In some embodiments, the system may utilize edge-aware smoothing filters, such as bilateral filtering, in order to preserve facial feature structures while smoothing blemishes. For example, bilateral filtering techniques can be applied to preserve the edge of the user's eyes and nose, as well as the facial boundary, while smoothing areas adjacent to them. In some embodiments, one or more skin-mask generation algorithms may be applied, including, e.g., color pixel classification, Gaussian Mixture Model (GMM) methods, and/or deep learning-based facial feature segmentation approaches. In some embodiments, the techniques used are robust to skin tone variation.

In some embodiments, the techniques used in steps 222 and 224 are configured to smooth over the low gradient parts in the image or video. Thus, the smoothing can be applied in a gradient, such that the smoothing is applied to a lesser degree to areas closer to rough sections of the face, and the smoothing is applied to a greater degree to areas closer to smooth sections of the face.

FIG. 3 is a flow chart illustrating an exemplary method for providing video lighting adjustment that may be performed in some embodiments. In some embodiments, the exemplary method begins at the point after step 210 is performed (i.e., after the system receives the video content within the video communication session). In some embodiments, at least part of the exemplary method is performed concurrently to one or more steps of FIG. 2.

At step 310, the system receives video content within a video communication session of a video communication platform, as described above with respect to step 210 of FIG. 2.

At step 312, the system receives a lighting adjustment request, including a lighting adjustment depth. In some embodiments, the lighting adjustment request and lighting adjustment depth are received from a client device associated with a user. In some embodiments, the user may have navigated within a user interface on their client device to the video settings UI window, and then checked an "adjust for low light" checkbox or manipulated another such UI element. In some embodiments, the UI element may be selected by a participant by, e.g., clicking or holding down a mouse button or other component of an input device, tapping or holding down on the UI element with a finger, stylus, or pen, hovering over the UI element with a mouse or other input device, or any other suitable form of selecting a UI element. In some embodiments, upon selecting the UI element, a slider element, sub window, or other secondary UI element appears which provides the participant with the ability to granularly adjust the depth of the lighting adjustment which is to be performed on the video of the participant. Upon selecting the desired lighting adjustment depth, or simply allowing for the default adjustment depth without selecting one (the default depth may be, e.g., 100% or 50% lighting adjustment depth), the selection of UI element(s) is sent to the system (e.g., the processing engine 102) to be processed.

In some embodiments, rather than receiving the lighting adjustment request from a client device, the system detects that a lighting adjustment should be requested based on one or more lighting adjustment detection factors, then automatically generates a lighting adjustment request including a lighting adjustment depth. In these embodiments, a user does not, e.g., select a UI element within a Video Settings UI window in order to enable lighting adjustment. Instead, the user may enable a setting to turn on automatic lighting adjustment. The system then detects when a lighting adjustment may be needed based on one or more factors. In some embodiments, such lighting adjustment detection factors may include, e.g., detected low light past a predetermined threshold on a user's face, in the background, or throughout the video. In some embodiments, factors may also include a detected video quality of the video content, and detection of relative lighting on the subject compared to the background of the video. In some embodiments, a user may specify parameters for when the system should detect that a lighting appearance adjustment is needed. For example, a user may specify in a video setting that the system should automatically adjust lighting only when the light in the room goes below a certain level. In some embodiments, the user may be able to select a range of skin tones that applies to them, and then the lighting adjustment can detect when there is low lighting based on those preselected skin tones. The lighting adjustment techniques can also preserve the user's skin tone based on the selected range of skin tones.

At step 314, the system detects an amount of lighting in the video content. In some embodiments, the system may employ one or more AI engines or AI techniques to detect the amount of lighting in the video content. In some embodiments, the video is analyzed using one or more image processing or image analysis techniques or methods. In some embodiments, a scene may be interpreted from the two-dimensional image or video content, and geometric reconstruction may occur based on the interpreted scene. In some embodiments, one or more light sources may be detected within the image or video content. In some embodiments, one or more positions, directions, and/or relative intensities of one or more light sources may be determined or estimated.

At step 316, the system modifies the video content to adjust the amount of lighting in real time or substantially real time based on the lighting adjustment depth. In some embodiments, the lighting is adjusted based on one or more AI engines or AI techniques, such as, e.g., deep learning techniques. In some embodiments, a convolutional neural network may be used to perform this adjustment. In various embodiments, the system may perform the lighting adjustment using processes or techniques such as, e.g., a dehazing based method, a naturalness preserved enhancement algorithm (NPE), an illumination map estimated based algorithm (LIME), a camera response based algorithm, a multi-branch low-light enhancement network (MBBLEN), and/or a bio-inspired multi-exposure fusion algorithm. In some embodiments, the system receives one or more detected lighting sources from step 312 and enhances the lighting in the image or video content such that it appears to be sourced from the detected lighting sources. In some embodiments, the depth or intensity of the lighting adjustment corresponds to the lighting adjustment depth that was received by the system. In some embodiments, the system adjusts the lighting while preserving natural elements of the image or video content. In some embodiments, the system has detected skin color or a range of skin tones of the participant appearing in the video, and the adjustment of lighting is performed such that the range of skin tones is preserved. For example, lighting may increase in an image or video, while a user's skin tone is still accurately represented in the image or video. Thus, in some cases the user's natural skin tone may appear brighter as the lighting changes, but does not appear lighter (i.e., the skin tone itself does not become lighter). The effect may therefore be as if a light or multiple lights are being shone on the user's natural skin, rather than the user's skin appearing as a different set of tones. In some embodiment, this is performed by modifying a Y' amount of a YUV color space within the image or video corresponding to lightness, without changing the color tone(s) of the skin, and modifying a UV amount of the image or video corresponding to color. In some embodiments, the system may separate skin areas from the background of the video. In some embodiments, the system separates the imagery of the user from the background of the video content, and then modifies the video content to adjust the amount of lighting differently for the background compared to the imagery of the user.

In some embodiments, the low light adjustment can be performed according to one or more themes which can be configured by the user. For example, a user may wish for the lighting in the video to appear as if a spotlight is directed on the user, with all else outside the spotlight appearing darkened. In another example, a user may wish to appear as if they are on a theater stage during a performance. Many such possibilities can be contemplated.

FIGS. 4A-4G are diagrams illustrating various aspects of the systems and methods herein through different example embodiments.

FIG. 4A is a diagram illustrating one example embodiment of a video settings UI element within a video communication session.

User interface 400 depicts a UI that a particular participant is viewing on a screen of the participant's client device. A bar at the bottom of the UI present a number of selectable UI elements within the UI. These elements include Mute, Stop Video, Security, Participants, Chat, and Share Screen. An up arrow element appears on some of the elements, including the Stop Video element. The user has clicked on the up arrow for the Stop Video element, and a sub menu has been displayed in response. The submenu includes a number of video-based elements, including an HD Camera, Choose Virtual Background, and Video Settings. The user is about to click on the Video Settings sub menu item.

FIG. 4B is a diagram illustrating one example embodiment of appearance adjustment UI elements within a video communication session.

The user from FIG. 4A has selected the sub menu element appearing as "Video Settings . . . ". The system responds by displaying a Video Settings UI window. The UI window includes a number of selectable elements for configuring video settings for the video communication session. One of the options appears as "Touch up my appearance" along with a checkbox UI element 402. Next to this element, an additional slider element 404 is displayed for allowing the user to select an adjustment depth as needed. The user can optionally drag the slider left or right to have granular control over the precise amount of adjustment depth desired.

Figure 4C:
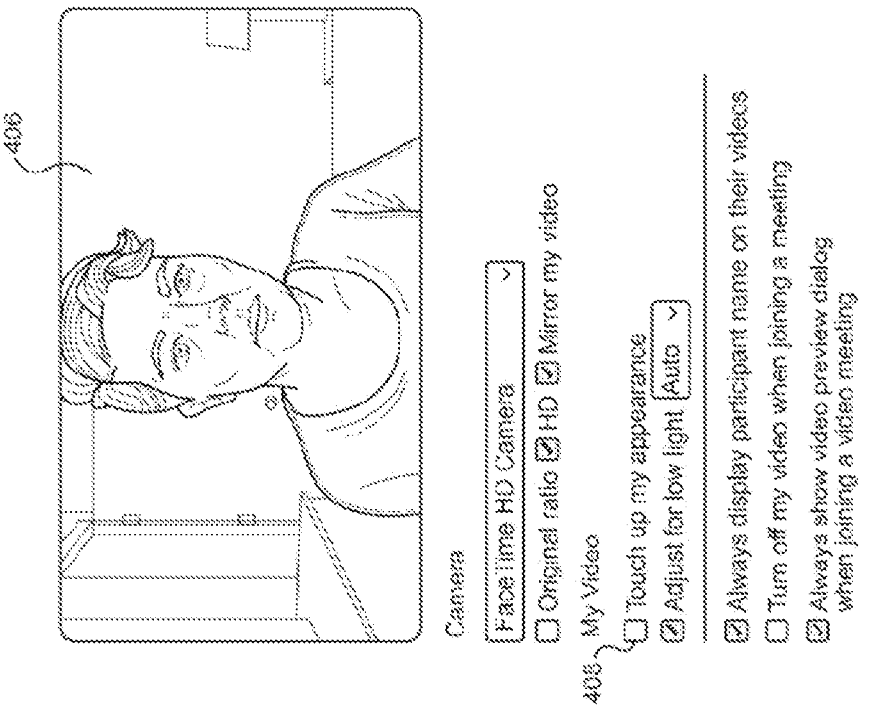
FIG. 4C is a diagram illustrating one example embodiment of an unselected appearance adjustment UI element within a video communication session.

FIG. 4C is a diagram illustrating one example embodiment of an unselected appearance adjustment UI element within a video communication session.

Similarly to FIG. 4B, a Video Settings UI window is displayed, including a "Touch Up My Appearance" element and an unchecked checkbox UI element 408. No slider UI element has appeared yet. A preview window 406 appears as well, showing as un-modified imagery of a user.

Figure 4D:
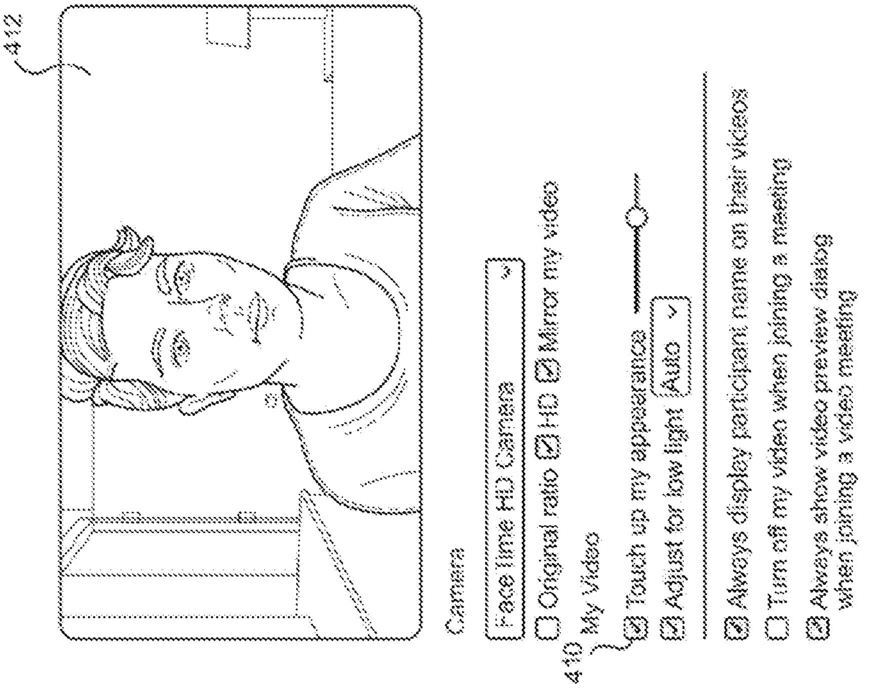
FIG. 4D is a diagram illustrating one example embodiment of a selected appearance adjustment UI element within a video communication session.

FIG. 4D is a diagram illustrating one example embodiment of a selected appearance adjustment UI element within a video communication session.

The user in FIG. 4C has opted to select the checkbox element 408 which was unchecked. The system responds by registering the checkbox element as a checked checkbox 410. The slider element appears now that the checkbox has been checked, and the user is able to adjust the appearance adjustment depth. The preview window 412 now shows a modified image of a user, as the system has performed the steps of the smoothing process for adjusting the user's appearance in real time or substantially real time.

Figure 4E:
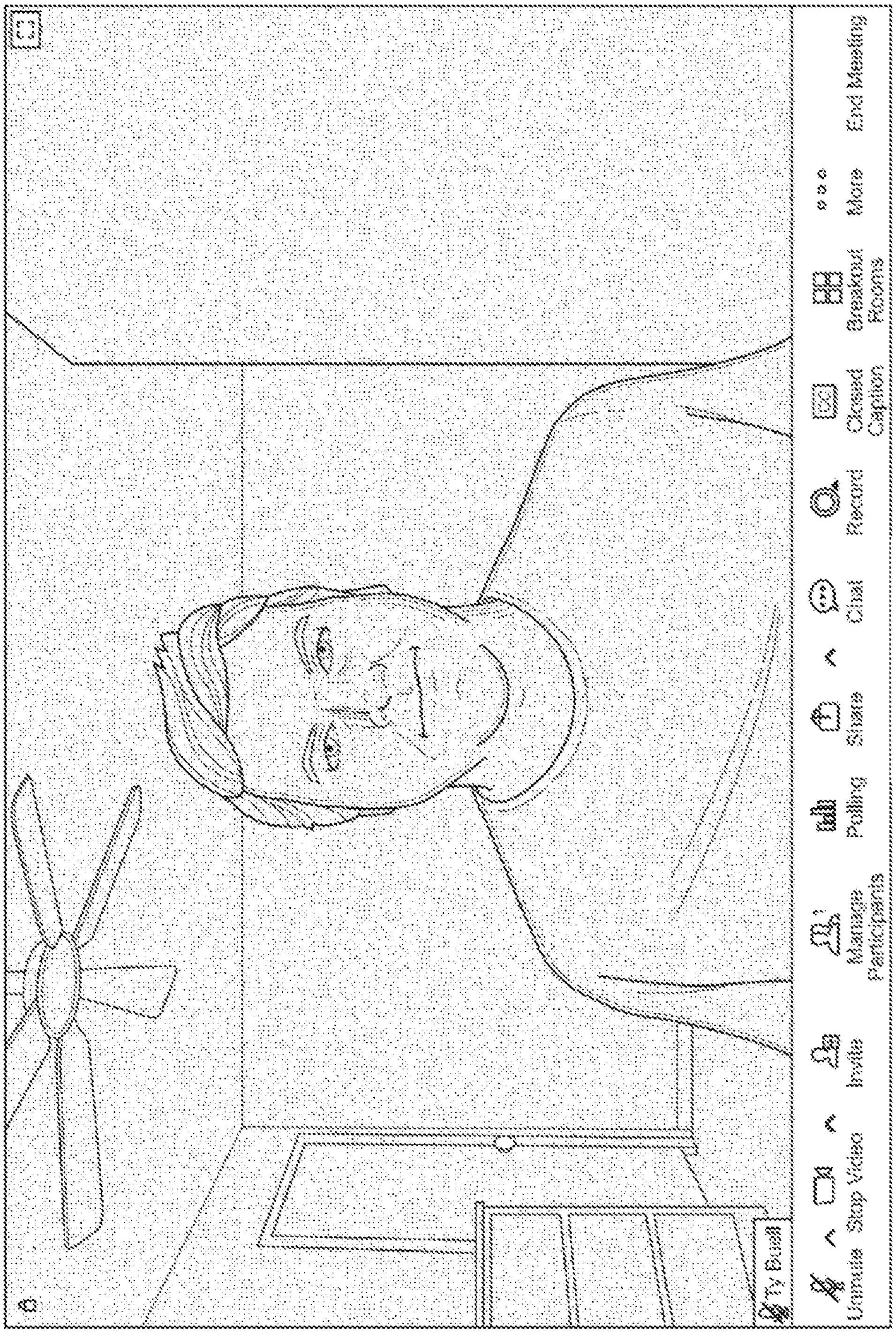
FIG. 4E is a diagram illustrating a video showing a low lighting environment within a video communication session.

FIG. 4E is a diagram illustrating a video showing a low lighting environment within a video communication session. The imagery of the user in the video content is hard to see and poorly-defined. The user's face is barely visible, and his expressions are difficult to ascertain for other users. A light source appears to be originating from behind the user, thus contributing to the darkened view of the user.

Figure 4F:
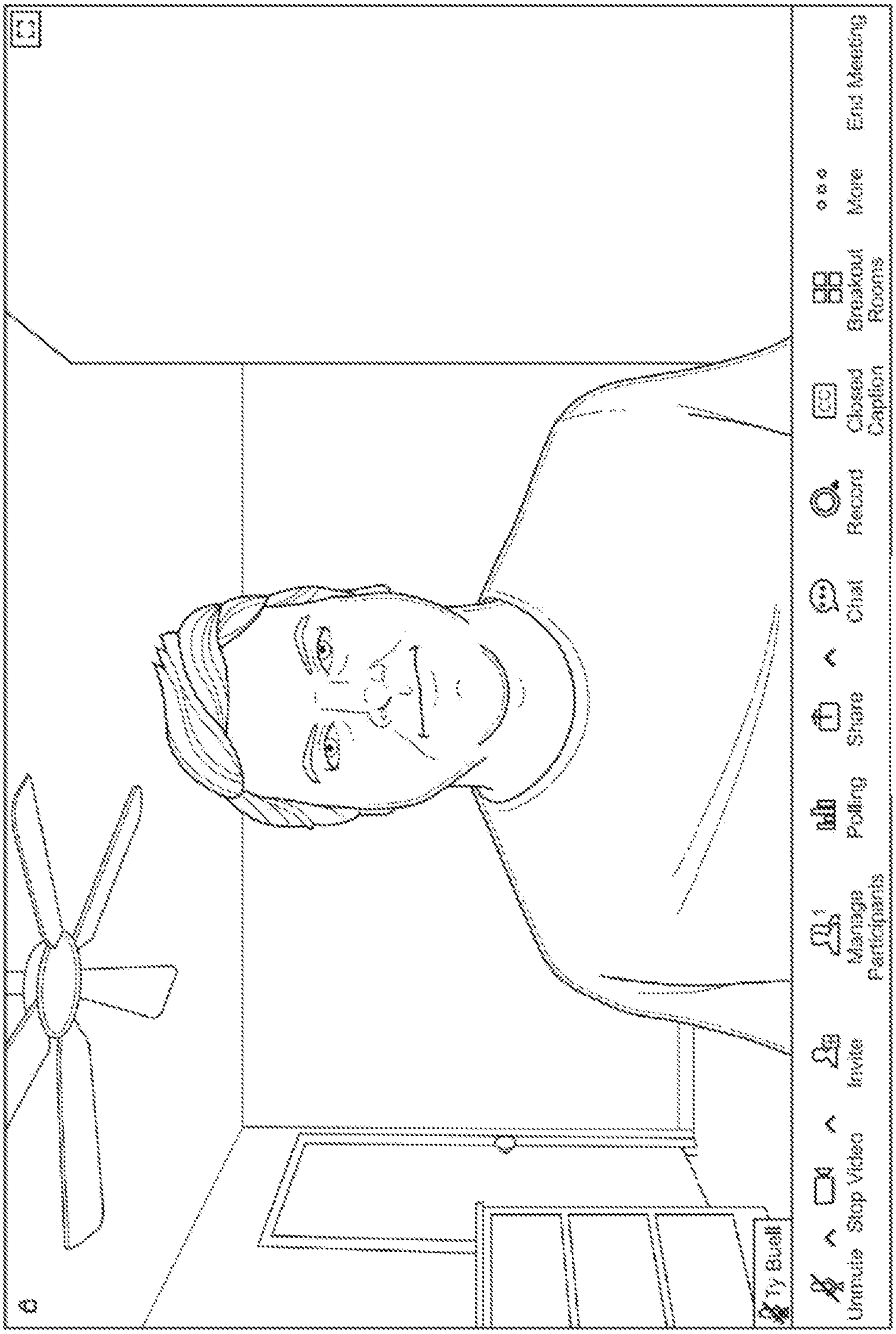
FIG. 4F is a diagram illustrating a video with lighting adjustment applied within a video communication session.

FIG. 4F is a diagram illustrating a video with lighting adjustment applied within a video communication session. After the lighting has been adjusted, the user is now much more visible, and his face and facial expressions are now clearly ascertainable. The lighting has been adjusted such that the lighting no longer appears to be solely located behind the user, but instead is diffuse and/or spread out around the room in an even or semi-even fashion. The user himself appears to be lit from the front rather than the back, as if a light is shining on his face in order to light him professionally. This lighting adjustment is performed in real time or substantially real time upon the system receiving a lighting adjustment request.

Figure 4G:
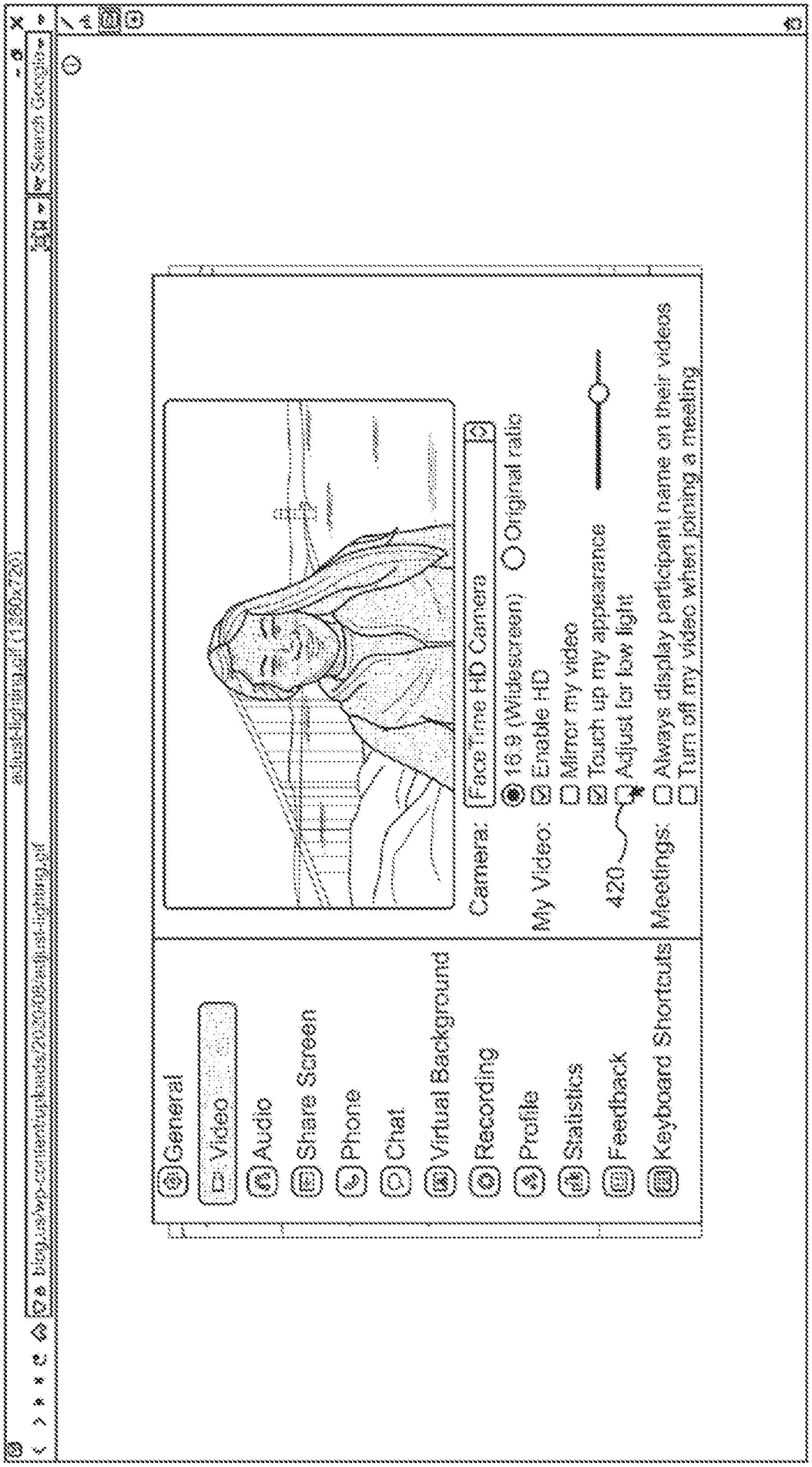
FIG. 4G is a diagram illustrating one example embodiment of an unselected lighting adjustment UI element within a video communication session.

FIG. 4G is a diagram illustrating one example embodiment of an unselected lighting adjustment UI element within a video communication session.

The Video Settings UI Window is once again shown, as in FIG. 4B. An "adjust for low light" video setting is visible along with an unchecked checkbox 420.

Figure 4H:
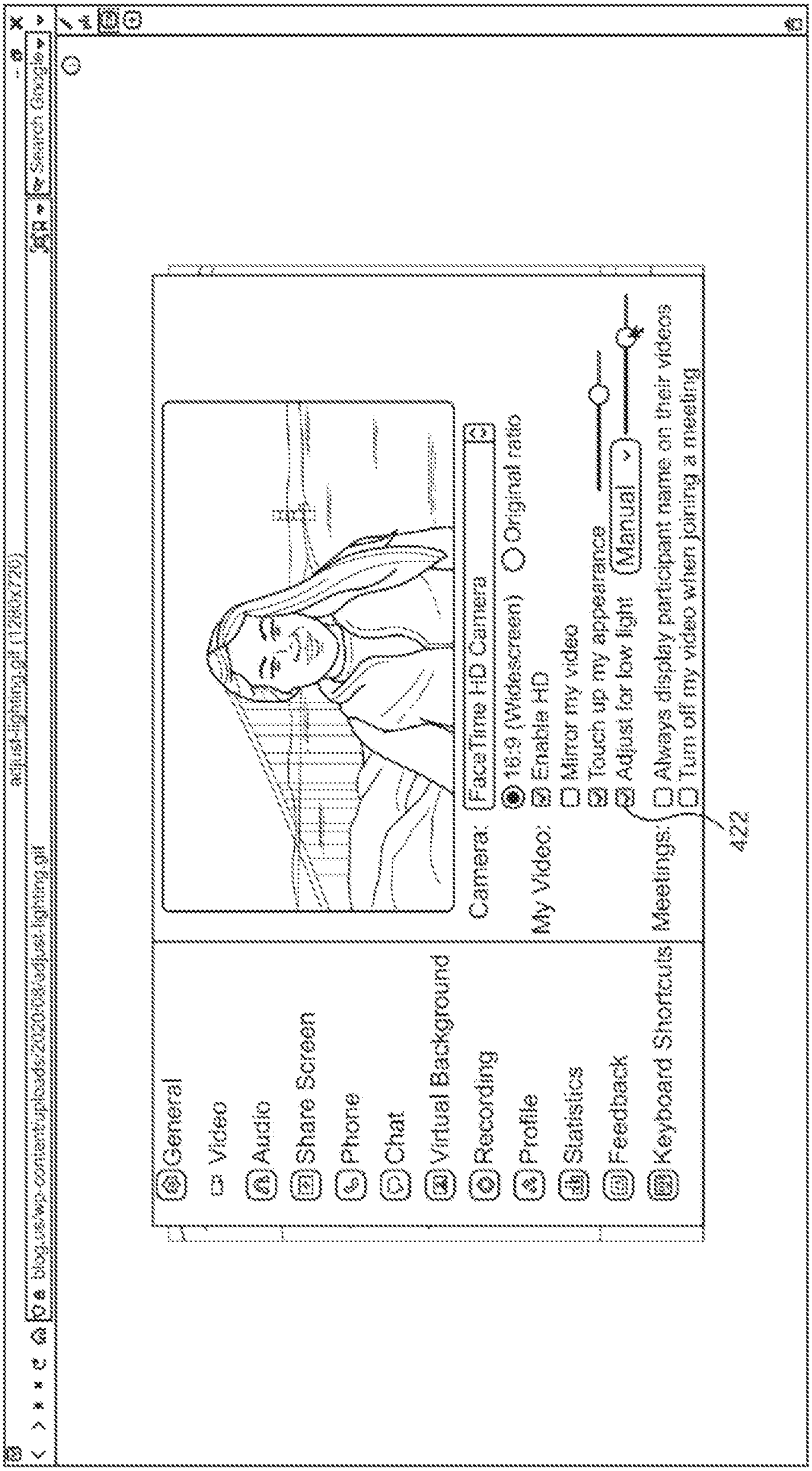
FIG. 4H is a diagram illustrating one example embodiment of a selected lighting adjustment UI element within a video communication session.

FIG. 4H is a diagram illustrating one example embodiment of a selected lighting adjustment UI element within a video communication session.

The user from FIG. 4G has opted to check the checkbox 420, and the system responds by presenting the checked checkbox 422 for adjusting the low lighting of the video, as well as a slider UI element for adjusting the lighting adjustment depth in a granular fashion.

Figure 5:
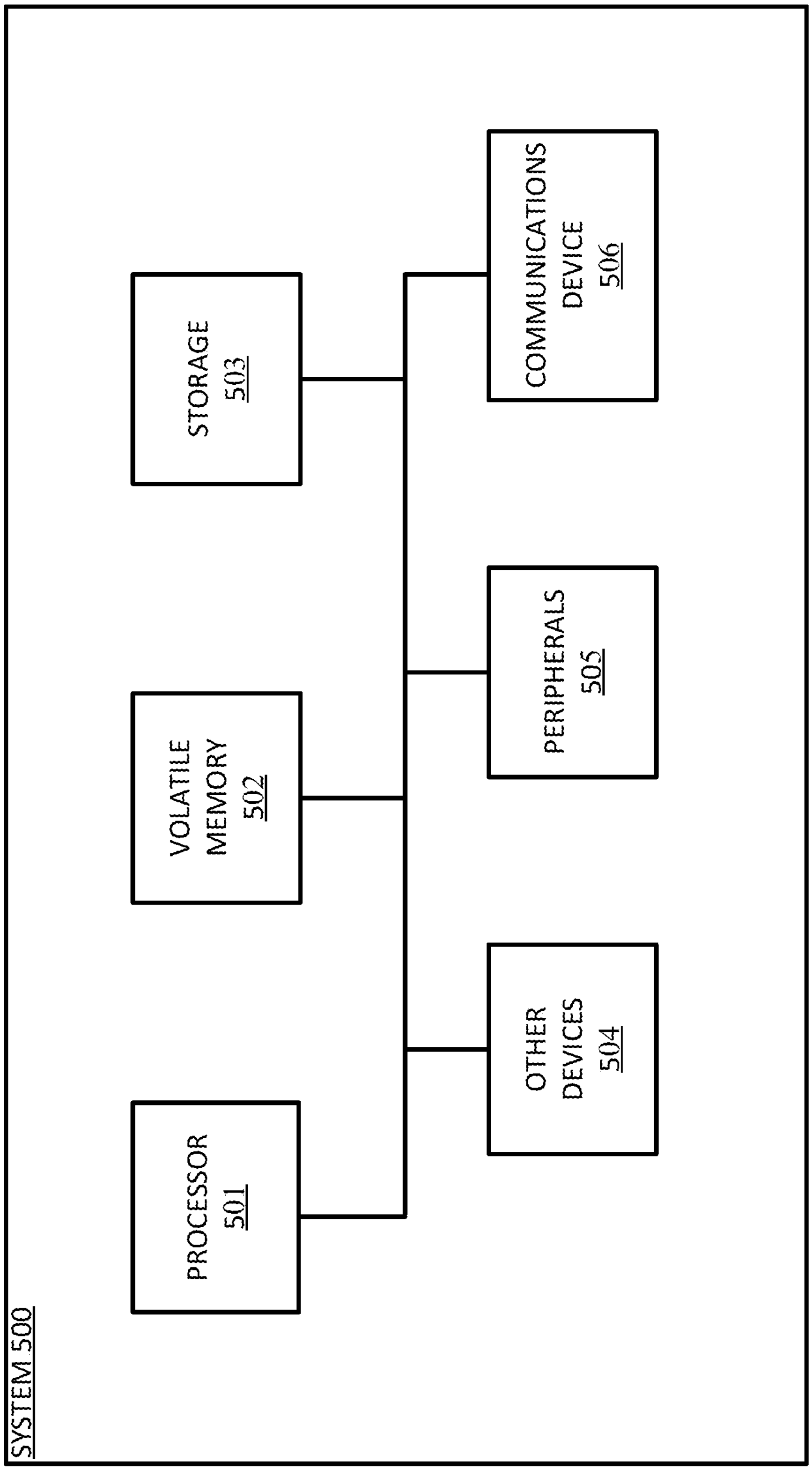
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-Rand DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

An aspect includes a method for providing low lighting adjustments within a video communication session. The method may include generating a lighting adjustment request comprising a lighting adjustment depth that defines a threshold for classifying a region of a video frame. The method may include segmenting the region of the video frame into texture sub-regions based on the threshold. The method may include smoothing areas adjacent to the texture sub-regions. The method may include detecting an amount of lighting using an artificial intelligence model that interprets a geometric reconstruction of a scene from the video frame. The method may include modifying the video frame to adjust the amount of lighting based on the scene. The amount of adjustment of lighting may correspond to the lighting adjustment depth.

A system may include one or more processors. The one or more processors may be configured to generate a lighting adjustment request comprising a lighting adjustment depth that defines a threshold to classify a region of a video frame. The one or more processors may be configured to segment the region of the video frame into texture sub-regions based on the threshold. The one or more processors may be configured to smooth areas adjacent to the texture sub-regions. The one or more processors may be configured to detect an amount of lighting with an artificial intelligence model that interprets a geometric reconstruction of a scene from the video frame. The one or more processors may be configured to modify the video frame to adjust the amount of lighting based on the scene, wherein the amount of adjustment of lighting corresponds to the lighting adjustment depth.

An aspect may include a non-transitory computer-readable medium containing instructions for providing low lighting adjustments within a video communication session that when executed by a processor, cause the processor to perform operations. The operations may include generating a lighting adjustment request comprising a lighting adjustment depth that defines a threshold for classifying a region of a video frame. The operations may include segmenting the region of the video frame into texture sub-regions based on the threshold. The operations may include smoothing areas adjacent to the texture sub-regions. The operations may include detecting an amount of lighting using an artificial intelligence model that interprets a geometric reconstruction of a scene from the video frame. The operations may include modifying the video frame to adjust the amount of lighting based on the scene. The amount of adjustment of lighting may correspond to the lighting adjustment depth.

In one or more aspects, modifying the video frame to adjust the amount of lighting may include modifying one or more Y' or UV values for lighting in the video frame. In one or more aspects, imagery of a user may be detected within the video frame, the imagery of the user comprising a plurality of skin areas each having a color tone. In one or more aspects, modifying the video frame to adjust the amount of lighting may be performed without modifying the color tone of the plurality of skin areas. In one or more aspects, generating the lighting adjustment request comprises automatically detecting that a lighting adjustment should be requested based on one or more lighting adjustment detection factors. In one or more aspects, generating the lighting adjustment request comprises automatically generating a lighting adjustment request comprising the lighting adjustment depth. In one or more aspects, imagery of a user and a background may be detected within the video frame. In one or more aspects, the imagery of the user may be separated from the background of the video frame, wherein modifying the video frame to adjust the amount of lighting is performed differently for the background and the imagery of the user. In one or more aspects, a video settings UI comprising a selectable lighting adjustment UI element and a lighting adjustment depth UI element may be provided for display on a client device associated with the user. In one or more aspects, a video settings UI comprising a selectable lighting adjustment UI element and a lighting adjustment depth UI element may be provided for display on a client device associated with the user, wherein the lighting adjustment depth UI element is a slider which is controllable at the client device. In one or more aspects, a selection of the lighting adjustment depth UI element may be received. In one or more aspects, the selection of the lighting adjustment depth UI element may be stored as a user preference that is persistent across multiple video communication sessions. In one or more aspects, the lighting adjustment depth to be requested may be automatically detected based on one or more lighting adjustment detection factors.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “identifying” or “determining” or “executing” or “performing” or “collecting” or “creating” or “sending” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:

generating a lighting adjustment request comprising a lighting adjustment depth that defines a threshold for classifying a region of a video frame of a video communication session;

segmenting the region of the video frame into texture sub-regions based on the threshold;

smoothing areas adjacent to the texture sub-regions;

detecting an amount of lighting using an artificial intelligence model that interprets a geometric reconstruction of a scene from the video frame; and modifying the video frame to adjust the amount of lighting based on the scene, wherein the amount of lighting adjustment corresponds to the lighting adjustment depth.

2. The method of claim 1, wherein modifying the video frame to adjust the amount of lighting comprises modifying one or more Y' or UV values for lighting in the video frame.

3. The method of claim 1, further comprising:

detecting imagery of a user within the video frame, the imagery of the user comprising skin areas each having a color tone, wherein modifying the video frame to adjust the amount of lighting is performed without modifying the color tone of the skin areas.

4. The method of claim 1, wherein generating the lighting adjustment request comprises:

automatically requesting a lighting adjustment based on a detection of one or more lighting adjustment detection factors.

5. The method of claim 1, wherein generating the lighting adjustment request comprises:

automatically generating a lighting adjustment request comprising the lighting adjustment depth.

6. The method of claim 1, further comprising:

detecting imagery of a user and a background of the video frame; and separating the imagery of the user from the background of the video frame, wherein modifying the video frame to adjust the amount of lighting is performed differently for the background and the imagery of the user.

7. The method of claim 6, further comprising:

providing, for display on a client device associated with the user, a video settings user interface (UI) comprising a selectable lighting adjustment UI element and a lighting adjustment depth UI element.

8. The method of claim 6, further comprising:

providing, for display on a client device associated with the user, a video settings user interface (UI) comprising a selectable lighting adjustment UI element and a lighting adjustment depth UI element, wherein the lighting adjustment depth UI element is a slider which is controllable at the client device.

9. The method of claim 6, further comprising:

providing, for display on a client device associated with the user, a video settings user interface (UI) comprising a selectable lighting adjustment UI element and a lighting adjustment depth UI element, the method further comprising:

receiving a selection of the lighting adjustment depth UI element; and storing the selection of the lighting adjustment depth UI element as a user preference that is persistent across multiple video communication sessions.

10. The method of claim 1, wherein generating the lighting adjustment request comprises:

automatically requesting the lighting adjustment depth based on a detection of one or more lighting adjustment detection factors.

11. A system comprising:

one or more processors configured to:

generate a lighting adjustment request comprising a lighting adjustment depth that defines a threshold to classify a region of a video frame of a video communication session;

segment the region of the video frame into texture sub-regions based on the threshold;

smooth areas adjacent to the texture sub-regions;

detect an amount of lighting with an artificial intelligence model that interprets a geometric reconstruction of a scene from the video frame; and modify the video frame to adjust the amount of lighting based on the scene, wherein the amount of lighting adjustment corresponds to the lighting adjustment depth.

12. The system of claim 11, wherein the one or more processors are configured to modify the video frame to adjust the amount of lighting such that one or more Y' or UV values for lighting are modified.

13. The system of claim 11, wherein the one or more processors are further configured to:

detect imagery of a user within the video frame, the imagery of the user comprising of skin areas each having a color tone, and modify the video frame to adjust the amount of lighting without modifying the color tone of the skin areas.

14. The system of claim 11, wherein the one or more processors are further configured to:

automatically request a lighting adjustment based on a detection of one or more lighting adjustment detection factors.

15. The system of claim 11, wherein the one or more processors are further configured to:

automatically generate a lighting adjustment request comprising the lighting adjustment depth.

16. The system of claim 11, wherein the one or more processors are further configured to:

detect imagery of a user and a background of the video frame; and separate the imagery of the user from the background of the video frame, wherein the video frame is modified to adjust the amount of lighting differently for the background and the imagery of the user.

17. The system of claim 16, wherein the one or more processors are further configured to:

provide, for display on a client device associated with the user, a video settings user interface (UI) comprising a selectable lighting adjustment UI element and a lighting adjustment depth UI element.

18. The system of claim 16, wherein the one or more processors are further configured to:

provide, for display on a client device associated with the user, a video settings user interface (UI) comprising a selectable lighting adjustment UI element and a lighting adjustment depth UI element, wherein the lighting adjustment depth UI element is a slider which is controllable at the client device.

19. The system of claim 16, wherein the one or more processors are further configured to:

provide, for display on a client device associated with the user, a video settings user interface (UI) comprising a selectable lighting adjustment UI element and a lighting adjustment depth UI element;

receive a selection of the lighting adjustment depth UI element; and store the selection of the lighting adjustment depth UI element as a user preference that is persistent across multiple video communication sessions.

20. A non-transitory computer-readable medium containing instructions that when executed by a processor, cause the processor to perform operations comprising:

generating a lighting adjustment request comprising a lighting adjustment depth that defines a threshold for classifying a region of a video frame of a video communication session;

segmenting the region of the video frame into texture sub-regions based on the threshold;

smoothing areas adjacent to the texture sub-regions;

detecting an amount of lighting using an artificial intelligence model that interprets a geometric reconstruction of a scene from the video frame; and modifying the video frame to adjust the amount of lighting based on the scene, wherein the amount of lighting adjustment corresponds to the lighting adjustment depth.

* * * * *